(No Model.)

G. H. LOMAX.
GLASS LAMP FOUNTAIN.

No. 297,276. Patented Apr. 22, 1884.

Witnesses.
S. N. Piper
E. C. Pratt

Inventor.
Geo. Henry Lomax.
by R. H. Eddy, att'y.

UNITED STATES PATENT OFFICE.

GEORGE HENRY LOMAX, OF SOMERVILLE, MASSACHUSETTS.

GLASS LAMP-FOUNTAIN.

SPECIFICATION forming part of Letters Patent No. 297,276, dated April 22, 1884.

Application filed January 16, 1884. (No model.)

*To all whom it may concern:*

Be it known that I, GEORGE HENRY LOMAX, of Somerville, in the county of Middlesex, of the Commonwealth of Massachusetts, have invented a new and useful Improvement in the Manufacture of Glass Lamp-Fountains; and I do hereby declare the same to be described in the following specification and represented in the accompanying drawings, of which—

Figure 1:
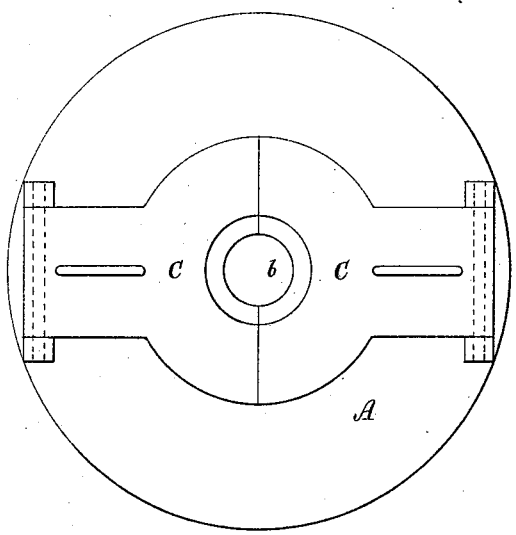
Figure 2:
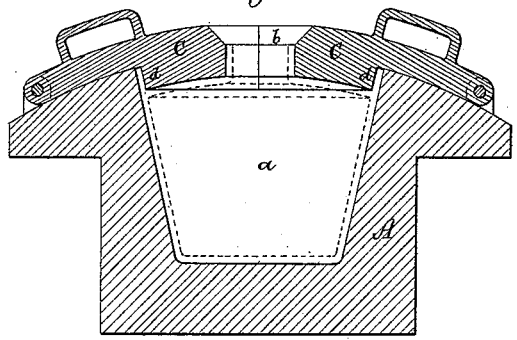
Figure 4:
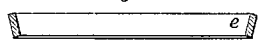
Figure 3:
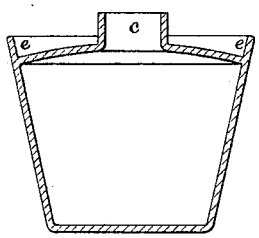
Figure 5:
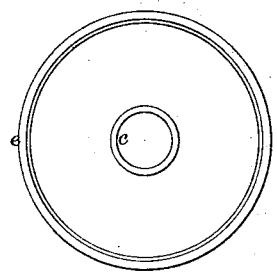

Figure 1 is a top view, and Fig. 2 a vertical section, of a mold for making a glass lamp-fountain of my improved kind, a transverse and vertical section of which is shown in Fig. 3. Fig. 4 is a transverse section of the tapering ring used in forming the fountain with a guard-lip extending around it and projecting upward from its top, as shown in Fig. 3, and also in Fig. 5, the latter figure being a top view of a glass lamp-fountain provided with such a lip, which is to intercept any oil that may flow down upon the said top, and thereby prevent it from running down the side of the fountain or lamp.

The nature of my invention is defined in the claims hereinafter presented.

The body A of the mold has within it a conical matrix, $a$, for forming the lamp-fountain. It also has two semicircular covers, C C, to said matrix, each of the said covers being hinged to the body, so as to be capable of being lifted off the matrix to uncover it, as occasion may require. In the central part of the cover is an opening, $b$, for forming the neck $c$ of the lamp-fountain. Furthermore, each of the said covers extends within the mouth of the matrix $a$, between which and the part $d$, projecting into the mouth and going around the cover circumferentially, is a space for reception of the ring $e$, to constitute the lip of the fountain.

In manufacturing the glass lamp a tapering ring of glass is to be made of the requisite shape to form the lip. The mold being open or uncovered, the said ring in a highly-heated state is to be placed in the mouth of the mold, and the covers are to be turned into the mouth and within the hot ring, so as to crowd it firmly to its seat. A workman is next to raise the covers and introduce into the mold a mass of molten glass, and by means of a tube attached to it blow it out against the sides of the matrix and the hole $b$, and also against under sides of the covers and the lower edge of the glass ring, thereby causing the latter to adhere to the blown-out glass, and with it to form a glass lamp-fountain having a lip extending around the top, at the periphery thereof.

Should it be required to blow a lamp-fountain of a globular or other form, the body of the mold may be made in sections, to allow of the said body being removed from the matrix. So the cover of the mold may be in one entire piece to receive the glass ring; but I propose to make the cover in two or more sections, hinged to the body, so as to be readily turned off or on the matrix, as occasion may require.

The mold hereinbefore described differs from that represented in the United State Patent No. 275,563, in which the matrix is provided at top with a projecting ledge to serve not only as a stop to arrest the upward flow of the glass while being blown in the mold, but as a guide to enable the blower to determine the height or extent to which the lower portion of the article is to be blown. In my mold there is no such ledge, the sections of the cover where projecting into the matrix being formed so as to have between them and the encompassing portion of the matrix an annular space tapering downward to receive the conical ring of glass intended for the formation of the lip of the fountain. Furthermore, the process of operating with my mold differs essentially from that described in the said patent, inasmuch as there is no "folding in" of the molten glass or pressing it down to double it upon itself, in order to form the lip integral with the body of the fountain.

In operating with my mold, the lip, before the body of the lamp is blown, is made separately therefrom and inserted in the upper part of the mold and is completed in form by turning down against it the parts of the cover, after which and while the lip may be in a heated state, the body of the fountain is blown within the mold and against the lower edge of the lip, so as to unite therewith. With my improvement the mold-body, in case the lamp-fountain is to be a conical fountain in form, need not be in two separate parts independently of the cover, but may be in one single piece, from which the lamp-fountain, after having been made, can readily be extracted. With a ledge to the matrix, as shown in the said patent, a fountain could not be removed from the mold were its body in a single piece.

Lamp-fountains have been manufactured with "drip-flanges" by having to their mold a separable top having on its under side a groove into which the glass is blown to form the flange, such groove not being peripherally in the cover. With my improvement I have no such groove into which the glass is to be blown to form the flange, for a lamp-fountain made by my improved mold is in no respect blown into the covers or any parts thereof, in forming such fountain, such flange being a ring of glass inserted in a heated state in the upper part of the mold, and pressed against such, and held down therein by the peripheral recess of the covers. Therefore I do not claim a glass mold constructed as represented in said patent, in order to form the body of the glass lamp-fountain with a crimp or fold to constitute a drip-flange, such mold having at the upper part of its body-matrix a projecting ledge.

I claim—

1. A lamp-fountain consisting of a ring and a body united by casting or forming the body in a mold against the said ring previously laid therein, all being substantially as set forth, the said ring being to constitute a lip extending around and projecting above the top of the body, as explained.

2. The process substantially as described of making a glass lamp-fountain with a lip or drip-flange, such consisting in first making a ring of glass and inserting it within the upper part or mouth of a mold having a cover or covers recessed peripherally, as described, to receive such ring, and next placing the said cover or covers within the ring, so as to cover its upper edge, and blowing within the mold and against the lower edge of the glass ring in a sufficiently-heated state the glass to constitute the body of the fountain, such ring being thereby united to the body, as specified.

GEORGE HENRY LOMAX.

Witnesses:
R. H. EDDY,
E. B. PRATT.